(12) United States Patent  (10) Patent No.: US 7,679,325 B2
Seo                        (45) Date of Patent:   Mar. 16, 2010

(54) BATTERY MANAGEMENT SYSTEM AND DRIVING METHOD FOR CUTTING OFF AND COUPLING BATTERY MODULE FROM/TO EXTERNAL DEVICE

(75) Inventor: Se-Wook Seo, Yongin-si (KR)

(73) Assignee: Samsung SDI Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 227 days.

(21) Appl. No.: 11/396,536

(22) Filed: Apr. 4, 2006

(65) Prior Publication Data

US 2006/0226811 A1  Oct. 12, 2006

(30) Foreign Application Priority Data

Apr. 7, 2005 (KR) ............... 10-2005-0028872

(51) Int. Cl.
    H02J 7/00  (2006.01)
(52) U.S. Cl. ............... 320/116; 320/118; 320/119; 324/434
(58) Field of Classification Search ........... 320/118, 320/119, 122, 128, 132, 134; 324/427
    See application file for complete search history.

(56) References Cited

U.S. PATENT DOCUMENTS

| | | | |
|---|---|---|---|
| 5,153,496 A * | 10/1992 | LaForge | 320/119 |
| 5,321,627 A | 6/1994 | Reher | |
| 5,666,040 A * | 9/1997 | Bourbeau | 320/118 |
| 5,701,068 A | 12/1997 | Baer et al. | |
| 5,773,959 A | 6/1998 | Merritt et al. | |
| 5,773,962 A * | 6/1998 | Nor | 320/134 |
| 5,796,334 A | 8/1998 | Chen et al. | |
| 5,952,815 A * | 9/1999 | Rouillard et al. | 320/116 |
| 6,014,013 A * | 1/2000 | Suppanz et al. | 320/122 |

(Continued)

FOREIGN PATENT DOCUMENTS

CN  1415973  5/2003

(Continued)

OTHER PUBLICATIONS

State of Change (Wikipedia 2pages) print out from http://en.wikipedia.org/wiki/Sate_of_change, 2008.

(Continued)

*Primary Examiner*—Edward Tso
*Assistant Examiner*—Arun Williams
(74) *Attorney, Agent, or Firm*—Robert E. Bushnell, Esq.

(57) ABSTRACT

A battery management system for controlling a secondary battery module which includes a plurality of unit batteries includes a sensor, a comparator and a controller. The sensor sequentially measures respective voltages of the unit batteries. The comparator compares the respective voltages of the unit batteries to a cut-off voltage range and a recovery voltage range to determine if the voltages are within the cut-off voltage range and the recovery voltage range. The controller receives comparison results from the comparator, cuts off the secondary battery module from an external device when there is at least one unit battery within the cutoff voltage range, and couples the secondary battery module to the external device when all of the unit batteries are within the recovery voltage range.

19 Claims, 3 Drawing Sheets

U.S. PATENT DOCUMENTS

| | | | |
|---|---|---|---|
| 6,078,165 A * | 6/2000 | Ashtiani et al. | 320/116 |
| 6,104,166 A | 8/2000 | Kikuchi et al. | |
| 6,127,806 A | 10/2000 | Tanjo et al. | |
| 6,157,169 A | 12/2000 | Lee | |
| 6,255,826 B1 | 7/2001 | Ohsawa et al. | |
| 6,300,763 B1 | 10/2001 | Kwok | |
| 6,336,063 B1 | 1/2002 | Lennevi | |
| 6,377,030 B1 | 4/2002 | Asao et al. | |
| 6,411,063 B1 | 6/2002 | Kouzu et al. | |
| 6,472,880 B1 | 10/2002 | Kang | |
| 6,621,250 B1 | 9/2003 | Ohkubo et al. | |
| 6,639,409 B2 | 10/2003 | Morimoto et al. | |
| 6,803,766 B2 | 10/2004 | Kobayashi et al. | |
| 6,892,147 B2 * | 5/2005 | Bui et al. | 702/63 |
| 7,061,246 B2 * | 6/2006 | Dougherty et al. | 324/426 |
| 7,126,342 B2 | 10/2006 | Iwabuchi et al. | |
| 2001/0035737 A1 * | 11/2001 | Nakanishi et al. | 320/122 |
| 2002/0030494 A1 | 3/2002 | Araki et al. | |
| 2002/0113595 A1 | 8/2002 | Sakai et al. | |
| 2003/0025481 A1 | 2/2003 | Bertness | |
| 2003/0146737 A1 | 8/2003 | Kadouchi et al. | |
| 2003/0189419 A1 | 10/2003 | Maki et al. | |
| 2004/0109274 A1 * | 6/2004 | Sato | 361/90 |
| 2004/0155627 A1 * | 8/2004 | Stanesti et al. | 320/127 |
| 2004/0169489 A1 * | 9/2004 | Hobbs | 320/104 |
| 2005/0156603 A1 * | 7/2005 | Lin et al. | 324/433 |
| 2005/0269991 A1 | 12/2005 | Mitsui et al. | |
| 2006/0028179 A1 | 2/2006 | Yudahira et al. | |
| 2006/0181245 A1 | 8/2006 | Mizuno et al. | |
| 2006/0202663 A1 | 9/2006 | Cho et al. | |
| 2007/0090802 A1 | 4/2007 | Seo | |
| 2007/0090803 A1 | 4/2007 | Yun et al. | |
| 2008/0077339 A1 | 3/2008 | Seo et al. | |
| 2008/0091364 A1 | 4/2008 | Lim et al. | |

FOREIGN PATENT DOCUMENTS

| | | |
|---|---|---|
| CN | 1604383 | 4/2005 |
| EP | 0990913 | 4/2000 |
| EP | 1081499 | 3/2001 |
| EP | 1203964 | 5/2002 |
| EP | 1841003 | 10/2007 |
| JP | 6231806 | 8/1994 |
| JP | 11-160367 | 6/1999 |
| JP | 2000-069606 | 3/2000 |
| JP | 2000-134705 | 5/2000 |
| JP | 2000-217261 | 8/2000 |
| JP | 2000-228832 | 8/2000 |
| JP | 2000-324702 | 11/2000 |
| JP | 2000-340267 | 12/2000 |
| JP | 2000-357541 | 12/2000 |
| JP | 2001-086656 | 3/2001 |
| JP | 2001-116776 | 4/2001 |
| JP | 2002-042906 | 2/2002 |
| JP | 2002-199510 | 7/2002 |
| JP | 2003-084015 | 3/2003 |
| JP | 2003-134675 | 5/2003 |
| JP | 2004-079324 | 3/2004 |
| JP | 2004-180397 | 6/2004 |
| JP | 2004-222433 | 8/2004 |
| JP | 2005-269752 | 9/2005 |
| JP | 2006-047130 | 2/2006 |
| JP | 2006-014480 | 12/2006 |
| KR | 10-1992-0009697 | 2/1991 |
| KR | 10-1997-0048597 | 7/1997 |
| KR | 1998-064646 | 10/1998 |
| KR | 10-0216808 | 6/1999 |
| KR | 10-2001-0043872 | 5/2001 |
| KR | 10-2002-0064998 | 8/2002 |
| KR | 2003-0065757 | 8/2003 |
| KR | 10-2004-0005133 | 1/2004 |
| KR | 10-2004-0092943 | 11/2004 |
| KR | 10-2004-0111144 | 12/2004 |
| KR | 10-2005-0019856 | 3/2005 |
| KR | 10-2005-0026360 | 3/2005 |
| KR | 10-2005-0089816 | 9/2005 |
| KR | 10-0554818 | 12/2005 |
| KR | 10-2006-0059680 | 6/2006 |
| KR | 10-2006-0094897 | 8/2006 |
| KR | 10-2007-0003628 | 1/2007 |
| KR | 10-2007-0029937 | 3/2007 |
| KR | 10-2006-0079505 | 7/2008 |
| WO | 2007007655 | 1/2007 |

OTHER PUBLICATIONS

Custom Power Solutions (10 pages) print out from http://www.mpoweruk.com/soc.htm, 2008.

* cited by examiner

BATTERY MANAGEMENT SYSTEM AND DRIVING METHOD FOR CUTTING OFF AND COUPLING BATTERY MODULE FROM/TO EXTERNAL DEVICE

CLAIM OF PRIORITY

This application makes reference to, incorporates the same herein, and claims all benefits accruing under 35 U.S.C. §119 from an application for BATTERY MANAGEMENT SYSTEM AND DRIVING METHOD THEREOF, earlier filed in the Korean Intellectual Property Office on the 7th day of Apr. 2005 and there, duly assigned Serial No. 10-2005-0028872.

BACKGROUND OF THE INVENTION

1. Technical Field

The present invention relates to a battery management system which includes a secondary battery module, and a driving method thereof, and more specifically, the invention relates to a method of controlling a secondary battery module for stably managing a battery according to a cut-off voltage of the secondary battery module.

2. Related Art

Recently, high power secondary batteries using non-aqueous electrolytes having a high energy density have been developed, and a large capacity secondary battery is formed by coupling a plurality of high output secondary batteries in series so that the secondary battery can operate a motor of an apparatus requiring high power (e.g., an electric vehicle).

As described, one large capacity secondary battery (hereinafter referred to, for convenience of description, as a battery module) includes a plurality of secondary batteries (hereinafter referred to as a unit battery) coupled in series.

In the above battery module, more specifically, in a secondary battery module for a hybrid electric vehicle (HEV), several to tens of unit batteries are alternately recharged and discharged. Therefore, it is required that the charge/discharge operation of the battery module be controlled so as to maintain the battery module in an appropriate operational mode.

For example, when the battery module is charged and used, the respective unit batteries forming the battery module are repeatedly charged and discharged, during which energy levels of the respective unit batteries become different from each other. When a plurality of unit batteries coupled in series are recharged after they are once discharged (i.e., used) to different energy levels, the energy levels of the recharged unit batteries also become different from each other. In this case, when the charge and discharge operations are repeatedly performed, some of the unit batteries forming a group are over-discharged so that output potentials thereof becomes less than 0V. When a user continuously uses the over-discharged unit batteries and discharges them, a battery reversal occurs so that potentials of the unit batteries are reversed.

As described, when unit batteries having different respective energy levels are coupled in series and charged, the unit batteries having higher energy levels transmit a charge completion signal to a charger before the unit batteries having lower energy levels are charged, and the charger prematurely finishes the charge operation. In addition, when the battery module includes the over-discharged unit battery, the unit batteries other than the over-discharged unit battery are overcharged before the over-discharged unit battery is fully charged. That is, incomplete charge and over-discharge operations are repeatedly performed or the battery reversal repeatedly occurs in some of the plurality of unit batteries, and complete charge or over-charge and incomplete discharge operations are repeatedly performed on the others of the plurality of unit batteries, and therefore the unit batteries are damaged.

Therefore, to reduce damage of the unit batteries, the conventional secondary battery module includes a battery management system (BMS) for managing states of the respective unit batteries and a relay for preventing current transmission when the battery module is out of order.

The BMS detects voltages of the respective unit batteries in the battery module, controls the relay to perform a cut-off operation when the detected voltage of the unit battery is higher or lower than a cut-off voltage which is a reference value, cuts off the current of the battery module, and recovers the unit battery.

The cut-off voltage is conventionally set to a range that is lower than 2.8V or higher than 4.3V. In this case, there is a problem in that the battery module is not sufficiently recovered since the relay is turned on when the voltages of the respective unit batteries are higher than 2.8V or lower than 4.3V while the voltages of the respective unit batteries are recovered to within the range of the cut-off voltage.

The above information is disclosed herein only for enhancement of an understanding of the background of the invention, and therefore it may contain information that does not form the prior art that is already known to a person of ordinary skill in the art in this country.

SUMMARY OF THE INVENTION

The present invention has been developed in an effort to provide a method of controlling a secondary battery module so as to enable sufficient recovery of the battery module to a stable voltage by differently setting a recovery condition of respective unit batteries for recovering from a cut-off state.

An exemplary battery management system for controlling the operation of a secondary battery, including a plurality of unit batteries, according to an embodiment of the present invention includes a sensor, a comparator, and a controller. The sensor sequentially measures respective voltages of the unit batteries. The comparator compares the respective voltages of the unit batteries to a cut-off voltage range and a recovery voltage range to determine if the respective voltages are within the cut-off voltage range and the recovery voltage range. The controller receives comparison results from the comparator, cuts off the secondary battery from an external device when there is at least one unit battery among the plurality of unit batteries out of the cutoff voltage range, and couples the secondary battery to the external device when all of the unit batteries are within the recovery voltage range.

In an exemplary driving method of a battery management system for a secondary battery, including a plurality of unit batteries, according to an embodiment of the present invention, (a) respective voltages of the plurality of unit batteries are measured, (b) the respective voltages of the unit batteries are compared to a cut-off voltage range and a recovery voltage range to determine if the respective voltages are within the cut-off voltage range and the recovery voltage range, and (c) the secondary battery is cut off from an external device when at least one unit battery among the plurality of unit batteries is out of the cut-off voltage range, and the secondary battery is coupled to the external device when all of the unit batteries are within the recovery voltage range, according to a comparison result obtained in (b) above.

BRIEF DESCRIPTION OF THE DRAWINGS

A more complete appreciation of the invention, and many of the attendant advantages thereof, will be readily apparent

DETAILED DESCRIPTION OF THE INVENTION

In the following detailed description, only certain exemplary embodiments of the present invention have been shown and described, simply by way of illustration. As those skilled in the art will realize, the described embodiments may be modified in various different ways, all without departing from the spirit or scope of the present invention.

Figure 1:
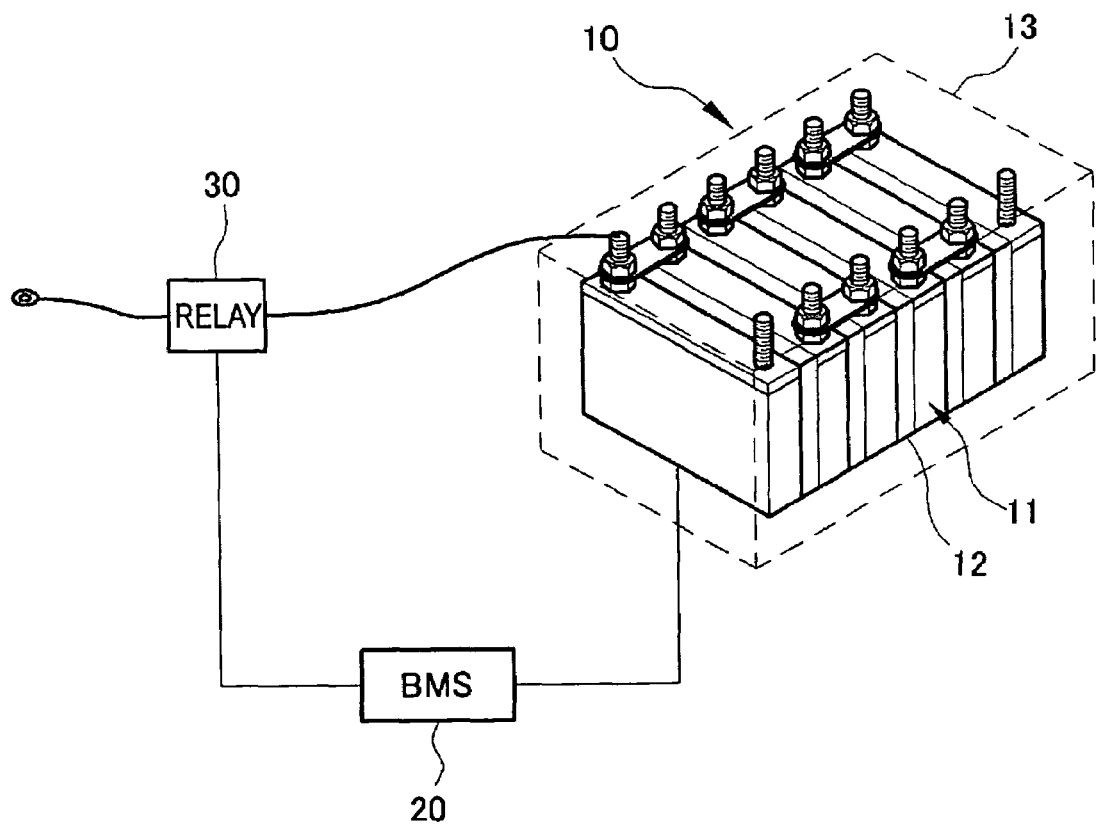
FIG. 1 is a schematic diagram of a secondary battery module according to an exemplary embodiment of the present invention.

FIG. 1 is a schematic diagram of a secondary battery module according to an exemplary embodiment of the present invention.

Referring to FIG. 1, a secondary battery module 10 according to the exemplary embodiment of the present invention is a large capacity battery module, and it includes at least one battery stack including a plurality of unit batteries 11 sequentially arranged with a predetermined interval between them, and a housing 13 in which the at least one battery stack is disposed and a coolant flows. A battery management system (BMS) 20 manages the respective unit batteries 11 of the battery stack. A relay 30 is coupled to an output terminal of the battery stack, and cuts off charge/discharge currents flowing to the battery stack from an external device or couples the battery stack to the external device.

The respective unit batteries 11 include a plurality of membrane-electrode assemblies, each including an anode plate and a cathode plate, where adjacent membrane-electrode assemblies are separated by separators. The unit battery 11 is formed as a conventional secondary battery for charging and discharging a predetermined level of power.

The battery stack according to the exemplary embodiment of the present invention includes the unit batteries 11 arranged in series with a predetermined interval therebetween.

According to the exemplary embodiment of the present invention, the battery stack is formed so that the respective unit batteries 11 having a rectangular shape are arranged to be upright (the rectangular shape of each is wide so that a pair of long sides and a pair of short sides are provided in the exemplary embodiment of the present invention). Each unit battery may have a cylindrical shape rather than having the rectangular shape.

The battery stack includes partition walls 12 disposed between the respective batteries 11 and on the most external unit battery. The partition walls 12 form uniform intervals between the unit batteries 11, allow air communication for temperature control, and support the sides of the respective unit batteries 11.

The BMS 20 according to the exemplary embodiment of the present invention measures values of temperature, current, and voltage of the respective unit batteries 11 of the battery module 10, and manages the secondary battery module 10 using the measured values. In addition, the BMS 20 according to the exemplary embodiment of the present invention determines if the voltages of the respective unit batteries 11 are within reference ranges of a cut-off voltage and a recovery voltage, and manages the secondary battery according to the determined results.

The relay 30 is formed at an output terminal of the secondary battery module 10, is turned on/off in response to a signal from the BMS 20, and cuts off charge/discharge currents from an external device (not shown) or couples the secondary battery module 10 to the external device.

The BMS according to the exemplary embodiment of the present invention will be described with reference to FIG. 2, which is a diagram of a configuration of a battery management system (BMS) according to the exemplary embodiment of the present invention.

Figure 2:
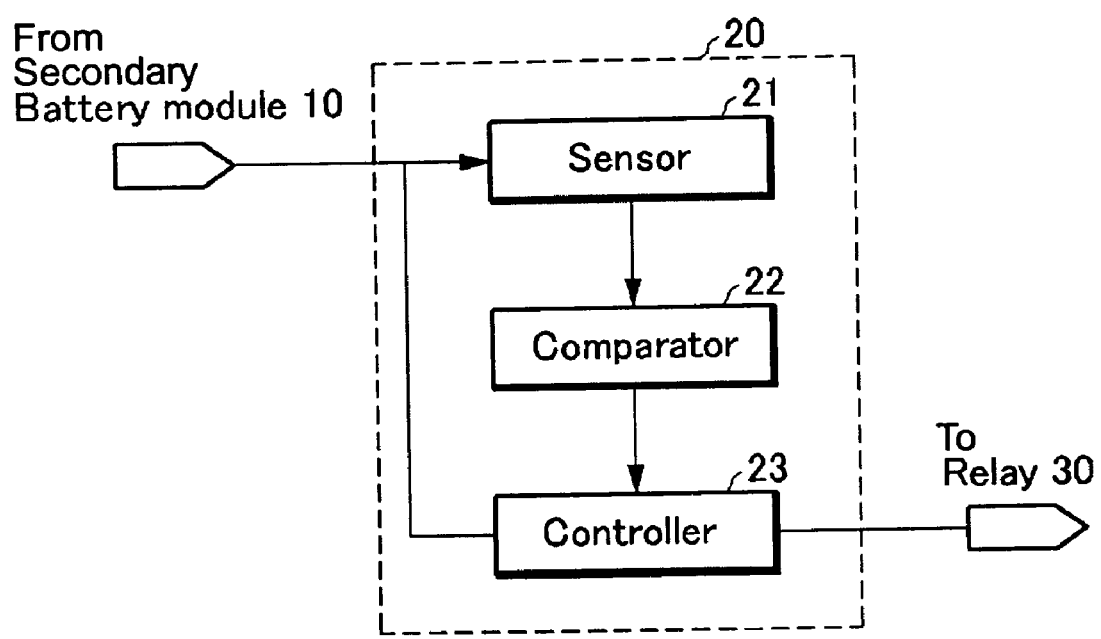
FIG. 2 is a diagram of the configuration of a battery management system according to the exemplary embodiment of the present invention.

Referring to FIG. 2, the BMS 20 includes a sensor 21, a comparator 22, and a controller 23.

The sensor 21 measures a voltage of each unit battery 11 of the secondary battery module 10. The sensor 21 sequentially measures voltages of the unit batteries 11 forming the secondary battery module 10 under the control of the controller 23, and transmits the measured voltages to the comparator 22.

The comparator 22 receives the voltages of the respective unit batteries 11 from the sensor 21. The comparator 22 determines if the voltages of the respective unit batteries 11 are within a cut-off voltage range and a recovery voltage range. The cut-off voltage range according to the exemplary embodiment of the present invention is defined to be a voltage range between boundary values for turning off the relay 30 coupling the secondary battery module 10 to the external device (not shown). Accordingly, when a unit battery 11 is out of the cut-off voltage range, the relay 30 is turned off. The recovery voltage range is defined to be a voltage range within a boundary value for turning on the relay 30 coupling the secondary battery module 10 to the external device. When the voltages of the respective unit batteries 11 are within the cut-off voltage range, the comparator 22 determines if the voltages of the respective unit batteries 11 are within the recovery voltage range. The comparator 22 transmits determined results to the controller 23.

According to the results received from the comparator 22, the controller 23 determines if the relay 30 is to be turned on or turned off. In addition, when detecting a unit battery 11 that is out of the cut-off voltage range, the controller 23 turns off the relay 30 so as to cut off the secondary battery module 10 from the external device. The external device according to the exemplary embodiment of the present invention, may be a power plant which is a motor. In addition, the controller 23 counts the number of unit batteries that satisfy the recovery voltage range. When voltages of all of the unit batteries 11 forming the secondary battery module 10 are within the recovery voltage range, the controller 23 turns on the relay 30 so as to couple the secondary battery module 10 to the external device. The recovery voltage range according to the exemplary embodiment of the present invention is within the cut-off voltage range. In further detail, the cut-off voltage range may be set to a voltage corresponding to 62% to 96% of a maximum output voltage of the unit battery 11, and the recovery voltage range may have a voltage range corresponding to 67% to 91% of the maximum output voltage of the unit battery 11. When the boundaries of the recovery voltage range and the cut-off voltage range are the same as each other, the relay 30 for coupling the secondary battery module 10 to the external device may be frequently turned on and turned off due to ripples of the unit battery voltage. Accordingly, since the charge/discharge currents of the secondary battery module 10 frequently flows and stops, the unit batteries 11 could be damaged, which could eventually deteriorate the secondary battery module 10. Therefore, in accordance with the present invention, when the recovery voltage range of the BMS 20 is set to be within the cut-off voltage range, the frequent turn-on/off of the relay 30 is prevented, and a degradation of the secondary battery module 10 may be prevented.

Figure 3:
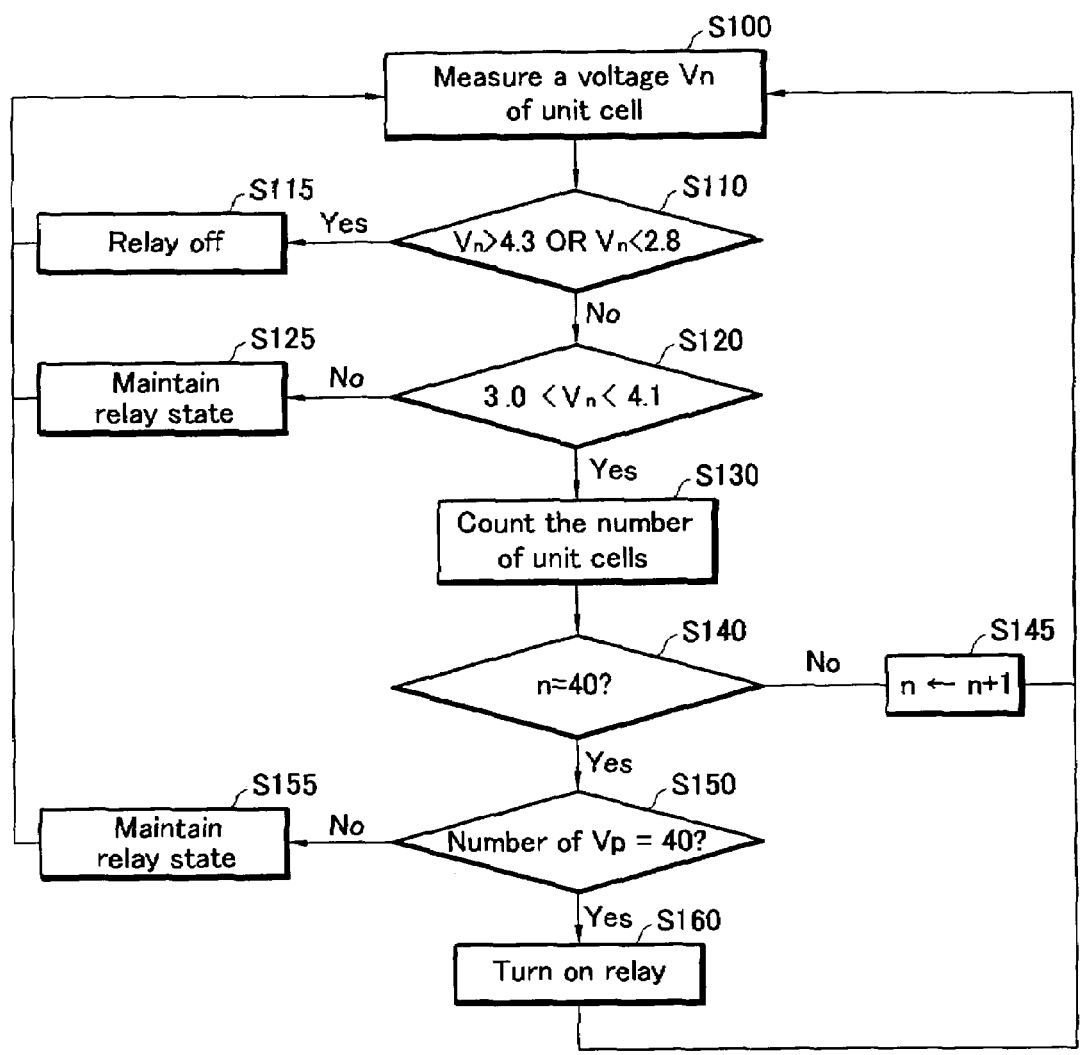
FIG. 3 is a flowchart of a driving method of the battery management system according to the exemplary embodiment of the present invention.

A driving method of the BMS 20 according to the exemplary embodiment of the present invention will now be described with reference to FIG. 3, which is a flowchart of a driving method of the battery management system according to the exemplary embodiment of the present invention.

Assuming that forty unit batteries 11 are provided in the secondary battery module 11, the driving method of the BMS 20 according to the exemplary embodiment of the present invention will be described with reference to FIG. 3.

Firstly, the sensor 21 measures a voltage Vn of the unit battery in step S100.

In step S110, the comparator 22 compares the unit battery voltage inputted from the sensor 21 and the cut-off voltage range, and determines if the unit battery voltage is out of the cut-off voltage range.

When the maximum output voltage is 4.5V, the cut-off voltage range is set to be a voltage range that is higher than 2.8V and lower than 4.3V, which are boundary values of 62% and 96% of the maximum output voltage. Therefore, when the voltage of the unit battery 11 is out of the cut-off voltage range (e.g., 2.7V), the relay 30 is maintained in a turned-off state, or the relay 30 is turned off when it is turned on, in step S115. Then, step S100 is performed again.

When the voltage of the unit battery 11 is within the cut-off voltage range, the comparator 22 determines if the voltage of the unit battery 11 is within the recovery voltage range in step S120. The recovery voltage according to the exemplary embodiment of the present invention is set to a voltage range that is higher than 3.0V or lower than 4.1V, which are boundary values of 67% and 91% of the maximum output voltage. When the voltage Vn of the unit battery 11 is out of the recovery voltage range, the relay 30 is maintained in a current or on state in step S125, and then step S100 is performed again.

When the voltage of the unit battery 11 is within the recovery voltage range, the controller 23 counts the number of unit batteries VP in step S130. The unit battery VP is defined as a unit battery having a voltage within the recovery voltage range.

As the above sequence of steps is repeatedly performed, the controller 23 determines, in step S140, if the voltages of all of the unit batteries 11 of the secondary battery module 10 are sequentially compared to the cut-off voltage range and the recovery voltage range. In step S140, n denotes the number of unit batteries 11 in the secondary battery module 10 according to the exemplary embodiment of the present invention. For example, when the secondary battery module 10 has 40 unit batteries, n is a number between 1 and 40, and the respective unit batteries 11 correspond to a specific value of n (from 1 to 40).

When n is not 40 in step S140, the controller 23 increases n by one in step S145, the relay 30 is maintained in its previous state, and step S100 is performed again. When n is 40 in step S140, the controller 23 determines that the voltages of all of the unit batteries 11 of the secondary battery module 10 have been compared to the cut-off voltage range and the recovery voltage range. In addition, when step S140 determines that n=40, the controller 23 compares the counted number of unit batteries 11 having voltages within the recovery voltage range to the total number of unit batteries 11 in the secondary battery module 10 in step S150.

When the counted number of the unit batteries 11 is not the same as the total number of the unit batteries 11 forming the secondary battery module 10, the controller 23 maintains the relay 30 in its previous state in step S155, and step S100 is performed again.

On the other hand, when step S150 determines that the counted number of the unit batteries 11 is the same as the total number of unit batteries 11 forming the secondary battery module 10, the controller 23 turns on the relay 30 in step S160.

When it is finally determined that the previous relay on/off state is maintained or the relay 30 is turned-on/off as described above, the BMS 20 measures the voltages of the respective unit batteries 11.

The secondary battery module 10 according to the exemplary embodiment of the present invention may be used as a battery for an HEV that requires high output and large capacity performance, but it is not limited thereto.

According to the exemplary embodiment of the present invention, the secondary battery module 10 is driven after the battery is sufficiently recovered since a recovery condition is additionally provided to the battery in a cut-off voltage state, and therefore stability of the secondary battery module 10 may be increased.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A battery management system for controlling an operation of a secondary battery module comprising a plurality of unit batteries, the battery management system comprising:

sensor means for sequentially measuring respective voltages of the plurality of unit batteries;

comparator means for comparing the respective voltages of the unit batteries to a cut-off voltage range to determine whether the respective voltages are within the cut-off voltage range, and for comparing the respective voltages of the unit batteries to a recovery voltage range to determine whether the respective voltages are within the recovery voltage range; and controller means for receiving comparison results from the comparator means, for cutting off the secondary battery module from an external device when at least one unit battery from among the plurality of unit batteries is outside the cutoff voltage range, and for coupling the secondary battery module to the external device when all of the unit batteries are within the recovery voltage range.

2. The battery management system of claim 1, further comprising:

a relay for coupling the external device to the secondary battery module; and wherein the controller means turns off the relay when at least one unit battery among the plurality of unit batteries is outside the cut-off voltage range, and turns on the relay when all of the unit batteries are within the recovery voltage range.

3. The battery management system of claim 2, wherein:

the comparator means transmits information on a detected unit battery that is outside the cut-off voltage range to the controller means when detecting the unit battery from among the plurality of unit batteries that is outside the cut-off voltage range; and the controller means cuts off the secondary battery module from the external device when receiving the information on the detected unit battery.

4. The battery management system of claim 3, wherein the comparator means compares the respective voltages of the unit batteries to the cut-off voltage range to determine whether the respective voltages of the unit batteries are within the cut-off voltage range, and when the respective voltages of the unit batteries are within the cut-off voltage range, the comparator means compares the respective voltages of the unit batteries to the recovery voltage range to determine whether the respective voltages of the unit batteries are within the recovery voltage range.

5. The battery management system of claim 4, wherein the controller means compares the respective voltages of the unit batteries to the recovery voltage range and counts the number of unit batteries that are within the recovery voltage range.

6. The battery management system of claim 5, wherein the secondary battery module is maintained cut off from the external device when it is not determined that all of the plurality of unit cells are within the recovery voltage range.

7. The battery management system of claim 1, wherein the comparator means compares the respective voltages of the unit batteries to the cut-off voltage range to determine whether the respective voltages of the unit batteries are within the cut-off voltage range, and when the respective voltages of the unit batteries are within the cut-off voltage range, the comparator means compares the respective voltages of the unit batteries to the recovery voltage range to determine whether the respective voltages of the unit batteries are within the recovery voltage range.

8. The battery management system of claim 7, wherein the controller means compares the respective voltages of the unit batteries to the recovery voltage range and counts the number of unit batteries that are within the recovery voltage range.

9. The battery management system of claim 8, wherein the secondary battery module is maintained cut off from the external device when it is not determined that all of the plurality of unit cells are within the recovery voltage range.

10. The battery management system of claim 1, wherein the recovery voltage range is within the cut-off voltage range.

11. A driving method of a battery management system of a secondary battery module which includes a plurality of unit batteries, the driving method comprising the steps of:
(a) measuring respective voltages of the unit batteries;
(b) comparing the respective voltages of the unit batteries to a cut-off voltage range to determine whether the respective voltages are within the cut-off voltage range, and comparing the respective voltages of the unit batteries to a recovery voltage range to determine whether the respective voltages are within the recovery voltage range, and producing a comparison result; and
(c) according to the comparison result obtained in step (b), cutting off the secondary battery module from an external device when at least one unit battery among the plurality of unit batteries is outside the cut-off voltage range, and coupling the secondary battery module to the external device when all of the unit batteries are within the recovery voltage range.

12. The driving method of claim 11, wherein the recovery voltage range is within the cut-off voltage range.

13. The driving method of claim 11, further comprising the step, between steps (b) and (c), of counting a number of unit batteries that satisfy the recovery voltage range when the respective voltages of the unit batteries satisfy the cut-off voltage range.

14. The driving method of claim 13, further comprising the step (d) of counting a number of unit batteries that are compared to the cut-off voltage range and the recovery voltage range, determining whether the counted number is equal to the number of the unit cells in the secondary battery module, and producing a determination result.

15. The driving method of claim 14, wherein, according the determination result, when the counter number obtained in step (d) is not equal to the number of the unit batteries in the secondary module, a previous coupling state, either coupled or decoupled, between the secondary battery module and the external device is maintained.

16. The driving method of claim 11, further comprising the step (d) of counting a number of unit batteries that are compared to the cut-off voltage range and the recovery voltage range, determining whether the counted number is equal to the number of the unit cells in the secondary battery module, and producing a determination result.

17. The driving method of claim 16, wherein, according the determination result, when the counter number obtained in step (d) is not equal to the number of the unit batteries in the secondary module, a previous coupling state, either coupled or decoupled, between the secondary battery module and the external device is maintained.

18. The battery management system of claim 1, wherein the controller means couples the secondary battery module to the external device when all of the unit batteries are within both the cut-off voltage range and the recovery voltage range.

19. The driving method of claim 11, wherein step (c) comprises coupling the secondary battery module to the external device when all of the unit batteries are within both the cut-off voltage range and the recovery voltage range.

* * * * *